United States Patent [19]

Zumkehr et al.

[11] Patent Number: 5,974,529

[45] Date of Patent: Oct. 26, 1999

[54] SYSTEMS AND METHODS FOR CONTROL FLOW ERROR DETECTION IN REDUCED INSTRUCTION SET COMPUTER PROCESSORS

[75] Inventors: John F. Zumkehr, Orange, Calif.; Amir A. Abouelnaga, Great Falls, Va.

[73] Assignees: McDonnell Douglas Corp., St. Louis, Mo.; TRW, Inc., Redondo Beach, Calif.

[21] Appl. No.: 09/076,361

[22] Filed: May 12, 1998

[51] Int. Cl.[6] ................ G06F 9/38; G06F 9/39; G06F 11/14

[52] U.S. Cl. ............... 712/41; 714/758; 714/45; 714/51; 712/239

[58] Field of Search .................... 395/183.11, 183.15, 395/185.02, 184.04, 185.05, 185.06, 185.07, 595; 712/41, 42, 206, 234, 239; 714/6, 45, 48, 51

[56] References Cited

U.S. PATENT DOCUMENTS

| | | |
|---|---|---|
| 4,819,237 | 4/1989 | Hamilton . |
| 5,243,607 | 9/1993 | Masson et al. . |
| 5,630,056 | 5/1997 | Horvath et al. . |
| 5,742,851 | 4/1998 | Sekine .................... 395/183.19 |
| 5,812,761 | 9/1998 | Seki ....................... 395/185.07 |
| 5,829,031 | 10/1998 | Lynch .................... 711/137 |

*Primary Examiner*—Daniel H. Pan
*Attorney, Agent, or Firm*—Alston & Bird LLP

[57] ABSTRACT

An instruction flow monitoring mechanism performs control flow error detection in a reduced instruction set computer (RISC) processor using signature monitoring. The signature monitoring is integrated into the RISC processor such that the instruction set of the RISC processor is enhanced to perform signature checking under all execution conditions. A signature monitor instruction causes the instruction flow to be checked for errors by comparing a pre-computed reference signature with a current signature and raising an error condition if the two signatures are unequal. The instruction also initializes the current signature.

26 Claims, 7 Drawing Sheets

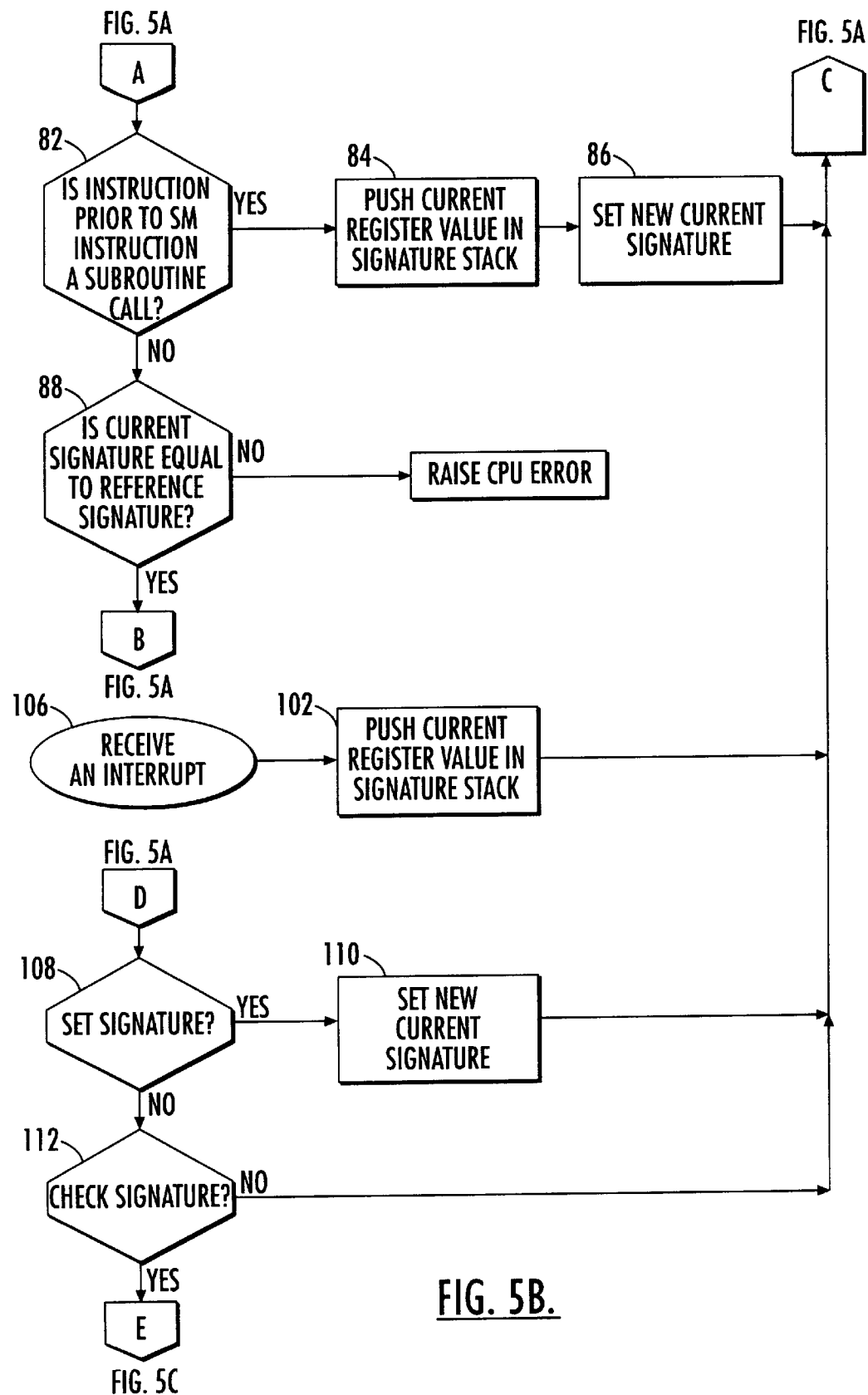

SYSTEMS AND METHODS FOR CONTROL FLOW ERROR DETECTION IN REDUCED INSTRUCTION SET COMPUTER PROCESSORS

The U.S. Government has a paid-up license in this invention and the right in limited circumstances to require the patent owner to license other on reasonable terms as provided for by the terms of Contract No. F03602-88-C-0058, Subcontract AB97202185, awarded by the Air Force.

FIELD OF THE INVENTION

The present invention generally relates to data processing, and more particularly, to error detection in data processing systems.

BACKGROUND OF THE INVENTION

A popular design for central processing units is reduced instruction set computer (RISC) processors using pipeline architecture. With pipeline architecture, the tasks performed by a processor are broken down into a sequence of functional units referred to as stages or pipeline stages. Each functional unit receives one or more inputs from the previous stage and produces one or more outputs, which may then be used by a subsequent stage. Thus, one stage's output is usually the next stage's input. Consequently, all of the stages are able to work in parallel on different, although typically sequential, instructions in order to provide greater throughput.

Typical stages of a RISC pipeline include instruction fetch, register fetch, arithmetic execution, and write-back to registers. In order to improve performance, a pipeline receives a continuous stream of instructions fetched from sequential locations in memory using addresses that are typically stored in a program counter or other suitable device. When several instructions are concurrently executing and each pipeline stage is performing its designated task for one of these instructions, a single instruction can be executed approximately every processor clock cycle. This design offers greater efficiency than other architectures, such as Complex Instruction Set Computer (CISC), where an instruction is executed in more than one processor clock cycle. In general, the architectural concepts behind RISC and CISC designs greatly differ, as is appreciated by those of ordinary skill in the art.

Because of the many advantages of the RISC architecture, only a few of which are discussed above, RISC processors enjoy a wide variety of applications including safety critical environments such as transportation, health care, manufacturing, defense, and space environments. The increased use of RISC architecture in such applications demands improvements in the dependability of these processors; that they perform what is expected correctly with a very high degree of probability by tolerating failures.

A detectable fault may generate a processor error that is represented by a processor output that violates expectations. The error may either be due to a fault in the data or in the instruction execution control flow. The detection of control flow errors in RISC processors is considered by many to be difficult because of the nature of control flow errors and the amount of hardware overhead associated with constructing the requisite detection logic. Examples of control flow errors include processing an incorrect sequence of valid instructions, improperly decoding and/or improperly executing an instruction, and vectoring a processor to an incorrect address. Control flow errors can be hardware induced, such as the erroneous calculation of an address or the faulty operation of the decode logic, or software induced, such as by viruses. It is generally accepted that detectors used in detecting data related errors such as error correction codes (ECC) are not adequately successful in detecting control flow errors. Other error detection methods that have been proposed include master/checker, sink check, and signature monitoring.

In master/checker error detection systems, a duplicate set of logic is provided to check the operation of a system. In essence, a boundary is drawn around a functional block of a system with transfers across the boundary being checked via comparison with the duplicate logic circuit. This provides excellent error detection, but more than doubles the amount of logic required. In addition, master/checker systems are prone to common mode errors wherein both the master and checker logic circuits produce the wrong data or execute the wrong control sequence. In such cases, the outputs of both circuits are the same, and no error is detected when the two outputs are compared.

In sink check systems, a sink detection circuit tries to verify that a required action for a particular command is executed. For example, sink detection logic for verifying that a command to write to a register was executed may be implemented by monitoring the write enable control to the register. However, sink logic does not provide extensive error coverage and is generally limited to simple control systems.

In signature monitoring systems, an instruction is considered part of an execution thread that consists of a series of processor-level instructions, i.e., machine code, with a known instruction execution sequence. Since the sequence is determined by the design and development of the software, i.e., the computer program, that will ultimately be executed by the RISC processor, a unique signature can be derived based on the operation codes for those instructions during development. This is called the reference signature. The reference signature code is used to verify the proper instruction execution sequence during system operations. During operations, a current signature is computed and compared with a pre-computed reference signature. The two signatures should be identical in the absence of a control flow error. It is noted that there are two methods of signature monitoring commonly used: horizontal and vertical signature monitoring. Horizontal monitoring checks the signature of every instruction executed by comparing the current signature with the reference signature. This method provides low detection latency because it validates correct execution for every instruction, but requires that the reference signature be supplied with each instruction. Thus, a trade-off occurs between optimizing the ability to detect errors, or error coverage, and the amount of increased overhead due to saving and processing signatures for each instruction. Vertical monitoring, on the other hand, checks the signature of a set of instructions. This method only adds overhead to the control flow when the signature is checked, but causes error detection latency to increase. Detailed discussion of signature monitoring can be found in numerous publications, including J. P. Shen and K. Wilken, "Concurrent Error Detection Using Signature Monitoring and Encryption," $1^{st}$ International Working Conference on Dependable Computers in Critical Applications, Santa Barbara, Calif. August (1989).

Current technical literature document signature monitor applications on CISC processors. However, these implementations are enhancements that are external to the processor itself. This type of external implementation reduces the error coverage potential for signature monitoring because it is difficult to capture state changes that affect instruction execution flow, i.e., control branch operations, where these changes are not communicated outside the processor.

Therefore, a heretofore unresolved need existed in the industry for a control flow error detection system and method that provides improved error detection in the instruction execution flow of RISC processors with minimum hardware overhead.

SUMMARY OF THE INVENTION

It is therefore an object of the present invention to provide improved control flow error detection.

It is another object of the present invention to provide computer program control flow error detection in a reduced instruction set computer (RISC) processor with minimum hardware overhead.

It is yet another object of the present invention to provide control flow error detection systems and methods that can be easily integrated in a RISC processor with minimum impact on hardware overhead and performance.

It is yet another object of the present invention to provide control flow error coverage for all execution scenarios, including branch operations in a RISC processor.

These and other objects of the present invention are provided by an instruction flow monitoring mechanism that performs control flow error detection in a RISC processor through signature monitoring. In accordance with the present invention, signature monitoring is integrated into the RISC processor such that the instruction set of the RISC processor is modified to perform signature checking. By making signature monitoring an internal operation, signature monitoring provides error coverage under all control flow scenarios, including those containing changes in the sequential control flow due to branch conditions or interrupts. This is accomplished, at least in part, by adding an instruction, which is referred to hereafter as the signature monitoring (SM) instruction, to the processor's instruction set architecture. This approach substantially increases error coverage and yields minimal impact on processor throughput. Further, by integrating the signature monitoring logic into the RISC processor, existing hardware can be utilized to perform particular functions of signature monitoring, thereby reducing the hardware overhead typically associated with signature monitoring systems. Another advantage of the present invention is its ability to provide common mode error detection, which is a typical shortcoming of master/checker implementations.

In accordance with an aspect of the present invention, a method for control flow error detection in a reduced instruction set computer (RISC) processing system may comprise the steps of computing a current signature upon the retrieval and execution of an instruction. A new current signature value is computed by combining the current value of the current signature with a fetched instruction that is to be executed by the RISC processor. The signature is stored in a memory location within the processor for rapid access. If the instruction is an SM instruction, then one of its operands may be a pre-computed reference signature. The current and reference signatures are subsequently compared. An error signal is generated when the two signatures are not identical.

The method may also include steps to maintain error coverage when a branch is executed. A branch may be permanent and unconditional, where the location (i.e., address) of the next instruction is not that of the instruction immediately following the instruction under execution. The address may be computed during application software development, when the program to be protected by signature monitoring is processed by a software tool called a compiler. A variant of the permanent and unconditional branch is when the address of the next instruction to be executed can not be determined during development, as in the case of a return instruction. Alternatively, the execution of the branch may depend on a set of processing conditions that are only determined during the execution of the software, i.e., a conditional branch. In this case, the current signature may not be computed until the outcome of the branch condition is determined, that is, whether to execute the branch or not to execute the branch. The method ensures continuous error coverage by providing information necessary to update the current signature for either of the branch outcomes.

The method may also include steps necessary to handle temporary branch conditions such as subroutine calls or interrupts. Provisions are made to save the current signature of the calling routine or the interrupted routine. Once the called routine completes or the interrupt handler completes, control is returned to the calling routine. The current signature value of the calling routine is restored for error coverage to resume in the calling routine.

The method may also include preparations necessary to enable signature monitoring. The creation and placement of the reference signature is performed during the development of the software to be executed by the RISC processor, specifically, normally during compilation. Naturally, the algorithm used to compute the reference signature should be identical to that used by the processor to compute the current signature. Selecting the appropriate algorithm is based on performing trade-off analysis between the extent of desired error coverage and the algorithm complexity. In accordance with an aspect of the present invention, a software tool, e.g., a compiler, is used to generate and place the reference signature in the software to be executed by the RISC processor. For example, polynomial division code (e.g., Cyclic Redundancy Check (CRC) code, or Checksum code) is suitable.

In accordance with another aspect of the present invention, a system for control flow error detection in a RISC processing system may comprise a signature mechanism that updates the current signature based on the currently executing instruction and the previous current signature. The system may further include a comparator that compares the current and reference signatures to detect errors in control flow.

In accordance with yet another aspect of the present invention, a system for control flow error detection in a RISC processing system may comprise means for receiving an instruction, means for receiving an SM instruction, means for initializing the current signature, means for retrieving the current signature from its storage location within the RISC processor, means for generating a new current signature based on the current signature and the instruction to be executed, means for retrieving a reference signature supplied with the SM instruction, and means for receiving and comparing the current and reference signatures.

Other features and advantages of the present invention will become apparent to one skilled in the art upon examination of the following drawings and detailed description. It is intended that all such features and advantages be included herein within the scope of the present invention, as defined by the appended claims.

BRIEF DESCRIPTION OF THE DRAWINGS

The present invention can be better understood with references to the following drawings. The elements of the drawings are not necessarily to scale, emphasis instead being placed upon clearly illustrating the principles of the present invention. Furthermore, like reference numerals designate corresponding parts throughout the several views.

FIGS. 5A–5C are flowcharts of the operation of an instruction flow monitoring mechanism in accordance with the embodiment of the present invention illustrated in FIG. 2.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited by the embodiment set forth herein. Rather, these embodiments are provided so that this disclosure will be thorough and complete, and will fully convey the scope of the invention to those skilled in the art.

I. Architecture

Figure 1:
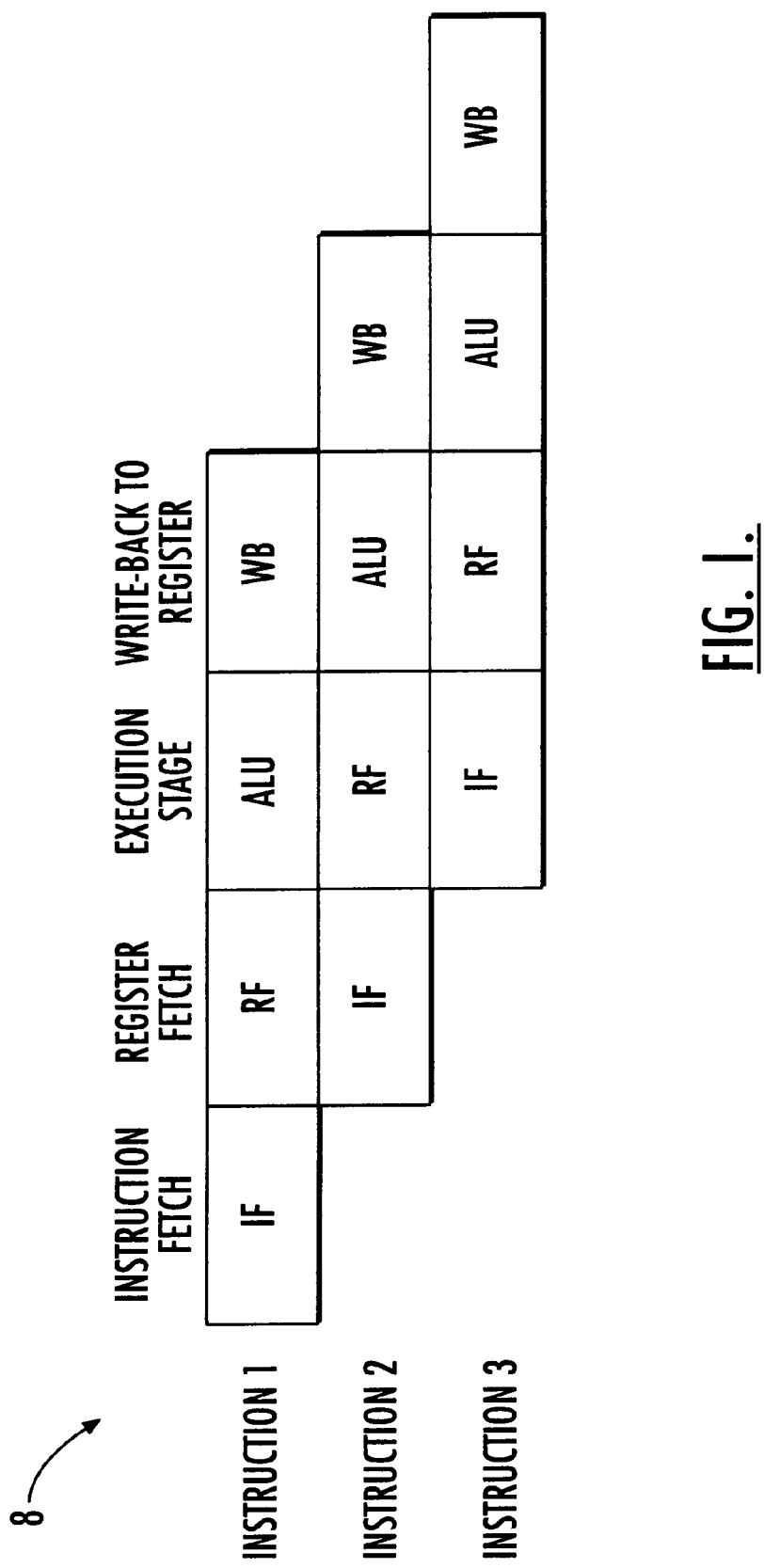
FIG. 1 a schematic illustration of three concurrently executing reduced instruction set computer (RISC) instructions in the RISC pipeline.

Referring to FIG. 1, a schematic illustration of a reduced instruction set computer (RISC) pipeline 8 is provided. In the architecture shown, there are four stages: an instruction fetch, a register fetch, an execution stage, and a write-back to register. These four stages are merely illustrative of the various stages that can be included as a part of a pipeline architecture, as will be appreciated by one skilled in the art.

In the instruction fetch stage, the next sequential instruction to be executed is retrieved, typically from an instruction cache associated with the processor. The instructions in the instruction cache are initially retrieved from an instruction memory device, as discussed in more detail hereinafter. In the register fetch stage, the retrieved instruction is decoded and the appropriate operands are retrieved from a register file located within the processor. In the execution stage, the operands are executed upon by an arithmetic logic unit (ALU), a multiply/divide unit (MDU), or a shifter. Upon completion of the execution stage, the write-back to register stage takes the results of the execution stage and writes them back to the register file utilized in the register fetch stage so as to cause a permanent processor state change. A permanent state change is defined herein as a general register, flag, or memory location that is modified as a result of the execution of an instruction.

In FIG. 1, instructions one, two, and three are being executed in parallel fashion so as to take advantage of the pipeline architecture. Preferably, instructions one, two, and three are taken from sequential memory locations, typically in the instruction cache, that are a part of a larger substantially continuous stream of instructions that are to be executed. The instructions are typically retrieved using instruction fetch addresses stored in processor registers. Within the instruction cache, the instructions are typically stored in sequential order so that the next instruction to be retrieved is ready.

Each stage of the pipeline is preferably implemented with independent hardware so that the instructions can be executed in an overlapping fashion. Thus, the instructions can go from stage to stage in sequential order with several instructions being executed concurrently. As a result, the effective execution time per instruction is approximately one processor clock cycle, regardless of the pipeline length.

Once an instruction is executed, the results are available to subsequent instructions by reading the appropriate register from the register file after the write-back stage or by bypassing the write-back stage and directly using the results of the execution stage in a subsequent instruction. Thus, if an error occurs in the flow of instructions, the execution of subsequent instructions in the pipeline may be corrupted by using the erroneous results from a previous instruction or by the execution of an incongruous instruction(s). Moreover, the presence of a control flow error in the execution of one or more instructions may interrupt the normal operation of the processor. For the purposes of the present disclosure, a control flow error may be hardware or software induced, as described in the Background section.

Figure 2:
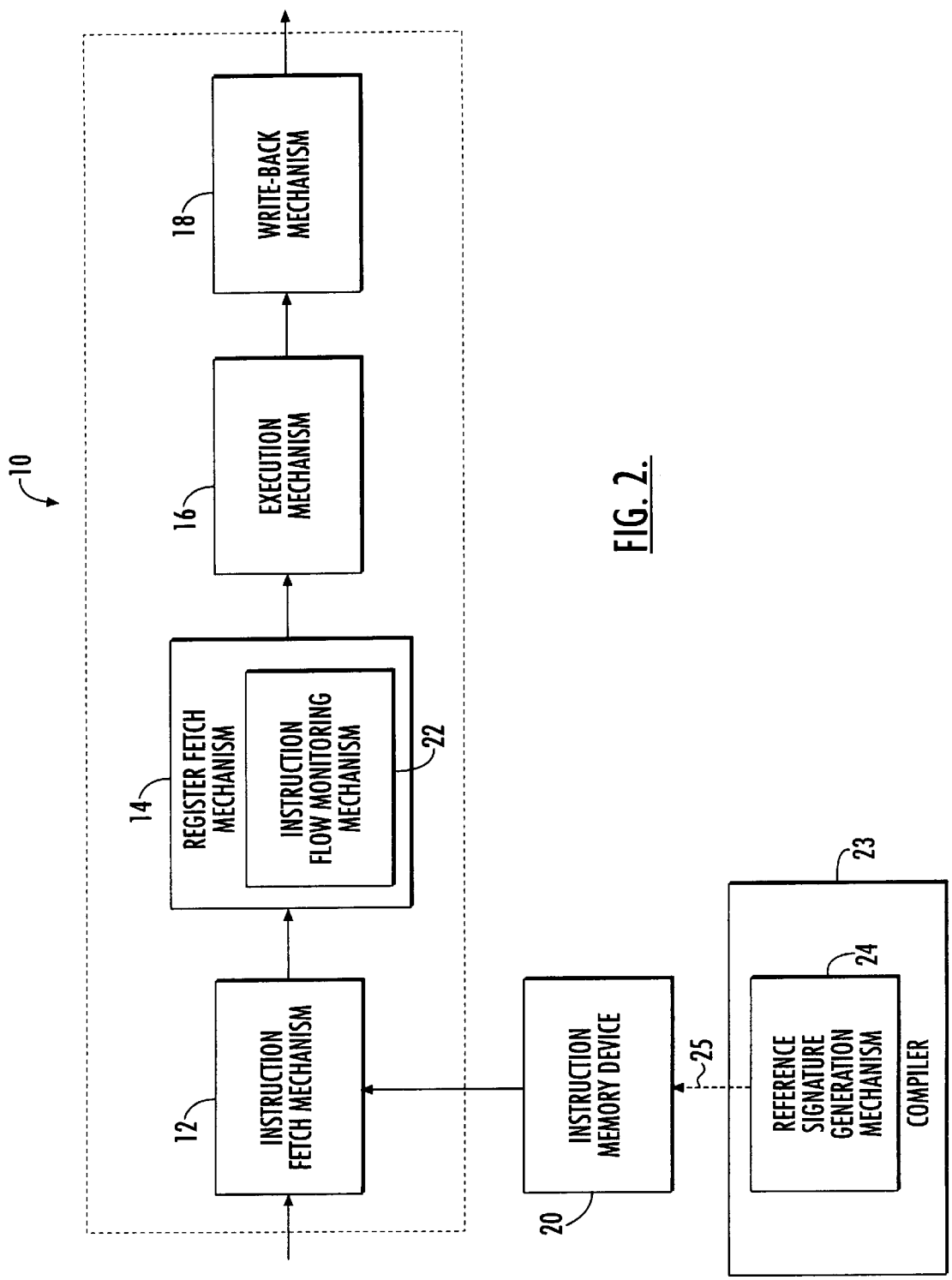
FIG. 2 is a schematic block diagram of a RISC processor incorporating one embodiment of the present invention.

With reference to FIG. 2, a RISC processor 10 in accordance with an embodiment of the present invention is illustrated. As shown, the RISC processor 10 includes an instruction fetch mechanism 12, a register fetch mechanism 14, an execution mechanism 16, and a write-back mechanism 18. An instruction memory device 20 provides the RISC processor 10 with instructions from the instruction set being executed, typically in sequential order. The instruction to be executed is typically fetched from an instruction cache or other type of instruction memory device 20. A software tool such as compiler 23 is logically connected to the instruction memory device 20 for generating machine code and loading the machine code (i.e. the instruction stream to be executed by the RISC processor 10) into the instruction memory device 20. The compiler 23 transforms the high-level language in which the program was originally written into machine language code for execution by the RISC processor 10. For purposes of the present disclosure, the compiler 23 includes the linker program. In addition, the compiler 23 includes a reference signature generation mechanism 24 which, among other things, performs such functions as control flow analysis, establishment of checkpoints for signature monitoring, and calculation of reference signatures and new signatures. The reference signature generation mechanism 24 generates an instruction that is inserted into the program that is to be protected by signature monitoring, hereafter referred to as a signature monitoring (SM) instruction. The reference signature is computed as the program to be protected is compiled by the compiler 23 and is inserted into the SM instruction once the linker program is complete. It is noted that because any signature generated by the reference signature generation mechanism 24 may be based on a complete instruction word, the linker software tools program should resolve immediate values before calculating the reference signatures.

It is further noted that the reference signature generation mechanism 24 may be implemented, for example, as a part of the linker program to reduce overhead as will be appreciated by those of ordinary skill in the art.

The reference signature generation mechanism 24 is configured to insert the SM instruction(s) into the program to be protected for purposes of performing either vertical or horizontal signature monitoring. It is noted, however, that vertical signature monitoring is preferred. It is also noted that the presence or absence of the SM instruction in the code is transparent to the correct execution of the code. If signature monitoring is not needed, then the SM instruction is not generated by the compiler for insertion into the code. Conventional compiler technology allows for this type of selectivity, as appreciated by those of ordinary skill in the art.

A format for an embodiment of the SM instruction may be as provided below:

| SM, control, new_sig, ref_sig | | | | |
|---|---|---|---|---|
| SM | control | 0 | new sig. | Ref. sig. |
| 31   26 | 25   21 | 20   16 | 15   8 | 7   0 |

The SM instruction is designed to control the signature monitoring of the processor. The SM instruction compares the current processor signature with the reference signature (Ref. sig.). If the two signatures are not equal, a processor error is raised. If a branch is indicated, a new current signature value is set if the branch is executed. Possible control actions of the SM instruction are as follows: no operation, initialize signature, check/initialize signature, and check signature.

The error latency of the detection performed by the present invention is controlled by the frequency of use of the SM instruction, and thus, the more the signature is checked, the lower the latency, though at the cost of lower system performance.

The SM instruction may be inserted into the instruction stream at a predetermined frequency if the control flow remains sequential, where the next instruction to be executed immediately follows the instruction being compiled. In this case, the SM instruction is to compare the reference signature to the current signature. To minimize the overhead of using signature monitoring, the SM instruction also sets a new current signature value. The determination of the SM instruction insertion frequency depends upon a trade-off analysis between the desired error detection latency and the memory usage overhead due to integrating signature monitoring.

Changes in the sequential execution of instructions are the result of the execution of branch instructions where control flow is permanently altered. Changes in the sequential execution can also be temporary due to the execution of a subroutine call, where control flow is temporarily altered during the execution of the subroutine, or the arrival of a surprise event, such as an exception or interrupt. When either a conditional or unconditional branch instruction is encountered, an SM instruction must be executed to determine the correctness of the code segment terminated by the branch instruction. In an embodiment of the present invention, the reference signature generation mechanism 24 inserts an SM instruction in the address location immediately following the memory location of the branch instruction. The SM instruction is to compare the current signature with the reference signature, and set a new current signature value. The new current signature value is the value the current signature would have had if the instruction at the target address were executed as part of a sequential instruction execution stream (that includes the execution of all instructions before the instruction at the target address, including the instruction just before the instruction at the target address). In this fashion, an identical new current signature value is used whether the execution flow reaches the target address as part of the sequential execution of an instruction stream containing the instruction at the target address, or the instruction at the target address is executed due to a branch from elsewhere in the program. The SM instruction is to be executed as a result of executing the branch instruction irrespective of the outcome of the branch condition. The resulting program then consists of segments of contiguous instructions bounded by an SM instruction to set a new signature value at the beginning of the segment and an SM instruction to compare the reference and current signature at the end of the segment.

In situations where execution control flow is temporarily altered due to a call instruction or an interrupt, provisions are made to store the current signature prior to executing the called routine or the interrupt handler. Moreover, a new current signature is used during the execution of the called routine or the interrupt handler. The current signature of the calling routine or the interrupted routine is restored once control flow returns to the instruction to be executed after the completion of the call or interrupt, as discussed in detail below.

With reference to FIG. 2, the instruction stream to be processed by the RISC processor 10 is initially processed by the compiler 23. While the compiler 23 is compiling the instruction stream, the reference signature generation mechanism 24 inserts the SM instructions at the appropriate locations in the instruction stream and generates the appropriate reference signatures. The process of loading the program into the instruction memory device 20 of the RISC processor 10 is preferably performed prior to the beginning of the execution of the program on the processor, as depicted by the dashed line 25.

The instruction fetch mechanism 12 comprises an instruction cache (not shown) that stores instructions for fast retrieval. Although the instruction fetch mechanism 12 preferably retrieves instructions from the instruction cache because this retrieval process is relatively fast, the instruction fetch mechanism 12 may retrieve instructions from other memory devices, such as the instruction memory device 20, if so desired. The instruction fetch mechanism 12 includes a pointer that is automatically incremented after each instruction is fetched so that the next sequential instruction to be executed is ready.

The register fetch mechanism 14 receives the next instruction to be executed from the instruction fetch mechanism 12. The register fetch mechanism 14 decodes the instruction to determine which type of operation the execution mechanism 16 will perform on the operands, and which operands to retrieve from the register files (not shown for purposes of brevity, though well known to those in the industry) associated with the register fetch mechanism 14. In essence, the register files and memory devices provide persistent storage of the operands of an instruction to be executed and the results of an instruction that has been executed.

The operands retrieved by the register fetch mechanism 14 are then passed on to the execution mechanism 16 which typically comprises one or more of an arithmetic logic unit (ALU), a multiply/divide unit (MDU), and a shifter. Depending upon the particular instruction provided by the instruction fetch mechanism 12, the operands will be directed to the appropriate device (e.g., the ALU, MDU, or shifter) for execution. The write-back mechanism 18 writes the results of the executed instruction back to the register file for use by subsequent instructions.

In accordance with the present invention, the register fetch mechanism 14 comprises logic circuitry to decode the SM instruction and extract the reference signatures or new signatures. The register fetch mechanism 14 includes an instruction flow monitoring mechanism 22. The instruction flow monitoring mechanism 22 computes the current signature. The instruction flow monitoring mechanism 22 implements the control flow error monitoring of the present invention, as described in detail below. Briefly stated, the instruction flow monitoring mechanism 22 comprises logic circuitry that generates the current signature, compares the current and reference signatures, and stores signatures during temporary control flow changes due to a subroutine call or an interrupt in a signature stack.

Figure 3:
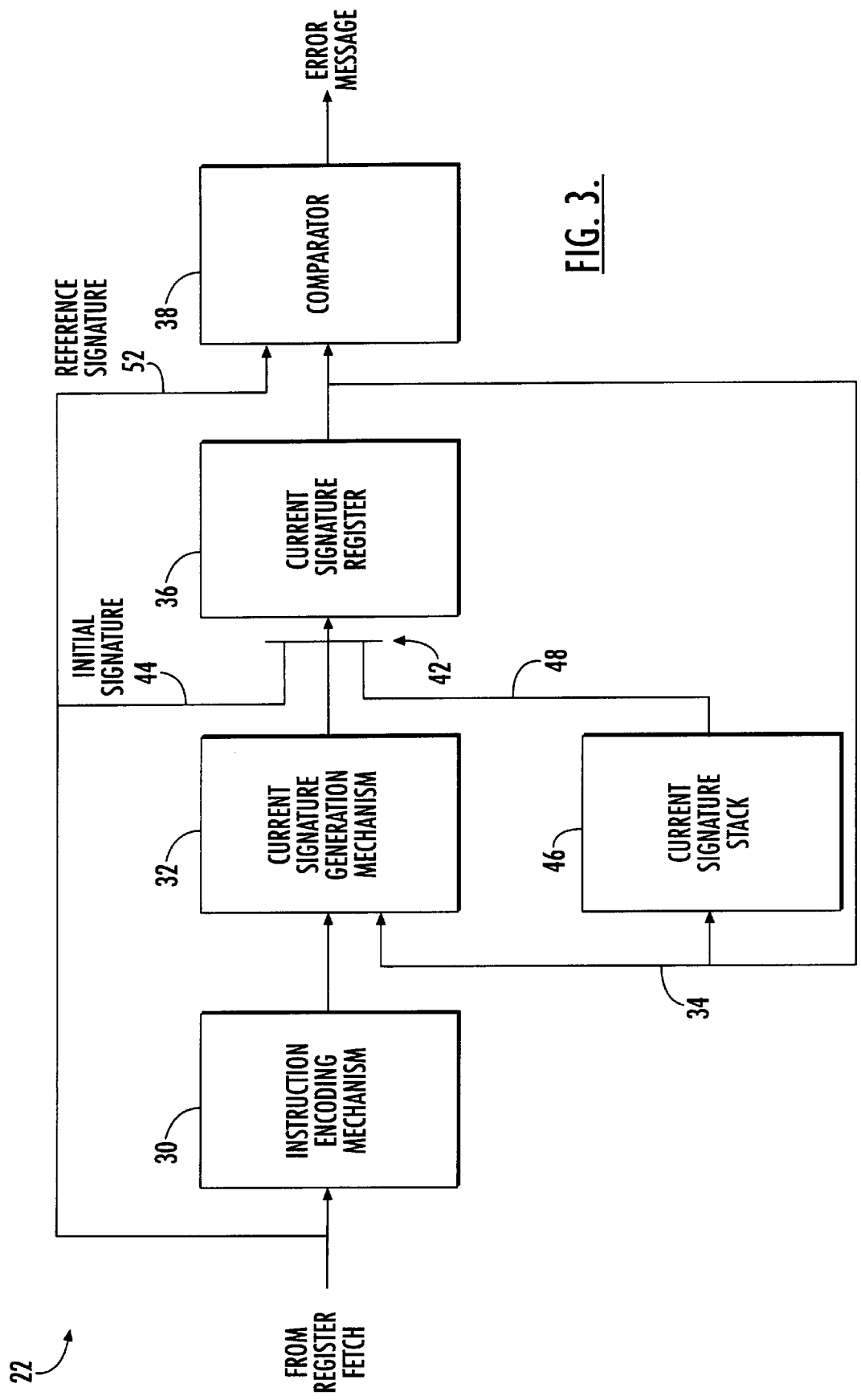
FIG. 3 is a schematic block diagram of the instruction flow monitoring mechanism of FIG. 2 in accordance with one embodiment of the present invention.

With reference now to FIG. 3, illustrated is an embodiment of the instruction flow monitoring mechanism 22 in accordance with the present invention. As shown, the reference signature obtained by the decoding of the SM instruction by the register fetch mechanism 14 is delivered to the comparator 38 via line 52.

With reference to FIG. 3, the instruction flow monitoring mechanism 22 preferably includes an instruction encoding mechanism 30 that receives instructions from the register fetch mechanism 14. In one embodiment, the instruction encoding mechanism 30 receives the instructions at a rate of one instruction every clock cycle. In order to reduce the amount of logic needed for control flow error detection, data encoding may be performed on the received instruction to reduce the number of bits necessary to compute the current signature. Alternatively, if the operation codes of the instructions are relatively short words, then the instruction encoding mechanism 30 may merely permit the instruction to pass-through, i.e., no encoding is performed, or the instruction encoding mechanism 30 may be completely omitted.

The method of encoding utilized by the instruction encoding mechanism 30 may include but is not limited to simple parity or Hamming codes. It may be advantageous with some RISC architectures to utilize particular encoding schemes because the RISC processor may include logic for performing the data encoding. For instance, in an embodiment of this invention, data encoding is provided as a part of the instruction register in the form of simple parity bits, which are used in detecting transfer errors. Thus, if simple parity bit encoding of the instruction register is utilized for the instruction encoding mechanism 30, the amount of hardware may be reduced. As another example, if the instruction memory feeding the instruction fetch mechanism 12 (FIG. 2) includes error correction code (ECC), then it may be advantageous to utilize Hamming code for the instruction encoding mechanism 30. Accordingly, it is recognized that the instruction encoding mechanism 30 may be incorporated into other functional components of the RISC processor 10 in order to reduce the hardware overhead.

This instruction flow monitoring mechanism 22 also includes a current signature generation mechanism 32 that receives the encoded instruction data from the instruction encoding mechanism 30. The current signature generation mechanism 32 combines the encoded instruction data with the current signature to produce a new current signature value associated with the instruction currently being executed by the RISC processor 10. The old current signature is stored and supplied by a current signature register 36, as will be described below, via line 34. The signature generation function performed by the current signature generation mechanism 32 may use checksum or polynomial division to generate the signature. For example, an embodiment of this invention may, in the case of a checksum operation, rotate the old current signature one place to the left and add the encoded instruction to generate the new current signature. In hardware, a checksum operation can be implemented using an adder. Alternatively, polynomial division operations can be implemented using linear feedback shift registers, which require less hardware than a checksum adder. Those skilled in the art will recognize that other suitable signature generation functions can be utilized in accordance with the present invention. Regardless of the manner in which the signature is generated, the results of the current signature generation mechanism 32 are stored in the current signature register 36, replacing the old current signature value. The current signature register 36 stores the current signature and provides it to a comparator 38. It is noted that the algorithm chosen to compute the new current signature must be identical to that used to generate the reference signature during the compilation of the code that is to be protected by signature monitoring.

In addition to being compared by the comparator 38, the new current signature generated by the current signature generation mechanism 32 will serve as the old current signature during the generation of the next new current signature. When a new code segment is entered as described above, a new current signature value is needed. In these circumstances, a new current signature value may be provided by the register fetch mechanism 14 to the current signature register 36 via line 44 and multiplexer 42, as the register fetch mechanism decodes the associated SM instruction. In an embodiment of the present invention, line 44 provides the current signature register 36 with specific bits taken from an instruction word on the line feeding the instruction to the instruction encoding mechanism 30, wherein the specific bits were placed in the instruction word by the register fetch mechanism 14. This allows the instruction flow monitoring mechanism 22 to generate a new signature. For example, in the case of a planned branch condition, the content of the current signature register 36 is dependent on whether or not the branch is taken. If the branch is not taken, then the current signature register 36 is updated as normal by the current signature generation mechanism 32. However, if the branch is taken, then register fetch mechanism 14 extracts the new current signature value from the SM instruction associated with the branch instruction. The register fetch mechanism 14 provides the new current signature value to the current signature register 36 via line 44. Thus, signature monitoring can continue uninterrupted during and following the branch instruction. As will be appreciated by those of ordinary skill in the art, the initialization to a new signature, as described above, can be used for handling changes in control flow due to other than branch conditions, such as subroutine calls, boot sequences, or interrupts.

In yet another alternative, a current signature stack 46 may restore a prior current signature value to the current signature register 36 via line 48 and multiplexer 42. This may be desirable in situations where control flow is temporarily changed as a result of executing a subroutine call or servicing an interrupt. Specifically, when returning from an interrupt or a subroutine call to the normal instruction flow, the current signature associated with the instruction immediately prior to the call instruction or the instruction at which the interrupt arrives may be pushed onto the current register stack 46 for use upon the return to the normal instruction flow so as to prevent gaps in the error detection coverage. It is noted that the current signature stack 46 receives signatures from the current signature register 36, as shown. Thus, if an interrupt is received or a subroutine call instruction is executed, then the signature generated for the instruction immediately prior to the execution of the called routine or interrupt handler instructions may be pushed onto the current signature stack 46 for use in error detection when returning from the routine.

Figure 4:
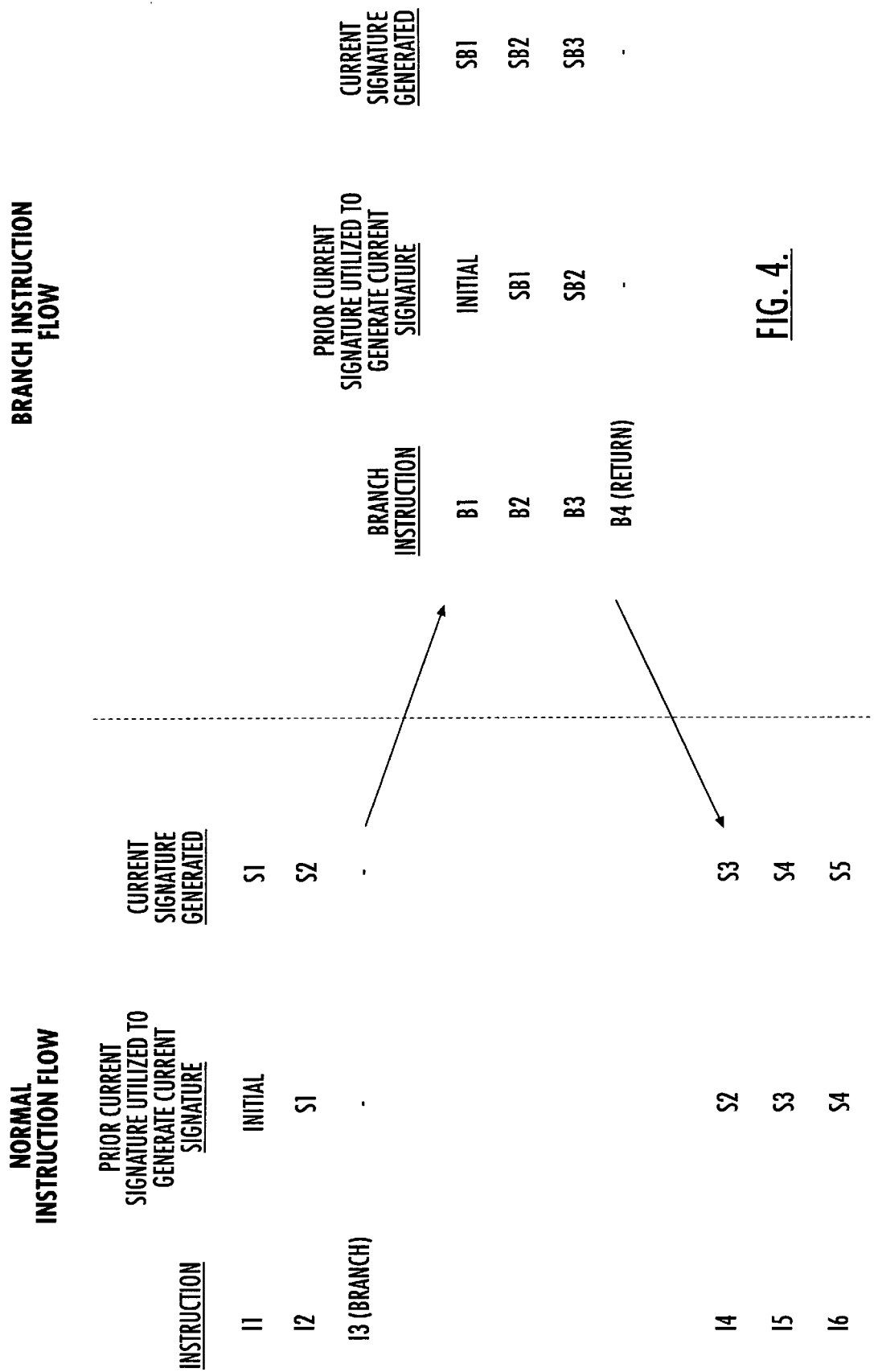
FIG. 4 is a schematic illustration of the instruction flow during a branch operation in accordance with an embodiment of the present invention.

For example, as illustrated in FIG. 4, signature monitoring in accordance with the present invention begins with the current signature generation mechanism 32 combining instruction I1 and an initial signature value provided by the reference signature generation mechanism 24 to generate signature S1. In sequential fashion, the next instruction is combined with the previously generated signature to generate respective new current signatures. The new current signatures are then compared by the comparator 38 with reference signatures supplied with the SM instruction and extracted by the register fetch mechanism 14 to determine if control flow errors have occurred. When a branch is encountered, such as instruction I3, and the branch is taken, then the RISC processor 10 begins to process the branch instruction. In order to continue control flow error detection in the branch, the register fetch mechanism 14 provides the current signature generation mechanism 32 with a new current signature value via the current signature register 36 for combining with first branch instruction B1 to generate branch signature SB1. As in the normal instruction flow, each branch instruction is combined with a previously generated current signature to generate a new current signature. The current signature which is generated is compared by comparator 38 with the reference signature provided by the register fetch mechanism 14 to determine if a control flow error has occurred. If the change in control flow is temporary due to the execution of a subroutine call instruction or the arrival of an interrupt, then upon return to the normal instruction flow, the next instruction to be executed, instruction I4, is combined with signature S2 which is retrieved from the current signature stack 46 to generate signature S3. The signature monitoring of the normal instruction flow then continues in the same manner as before the branch.

Thus, the control flow monitoring scheme of the present invention supports interrupts which vector control flow asynchronously by pushing the current signature on the current signature stack 46 and by loading the current signature register 36 with the signature value associated with the first instruction of the interrupt handler routine.

The comparator 38 compares the signature received from the current signature register 36 with the reference signature that is extracted by the register fetch mechanism 14 (FIG. 2) from an SM instruction, and received on line 52. If the comparator 38 detects different values for the current signature and the expected signature, an error signal is generated which indicates a control flow error has occurred. The comparator can be implemented utilizing any number of different well known schemes including equal and not equal logic functions where, for example, corresponding bits are compared using exclusive OR gates and the results are then combined with an OR gate to produce a predetermined signal if any one of the respective bits do not match which indicates that a control flow error exists.

II. Operation

Figure 5A:
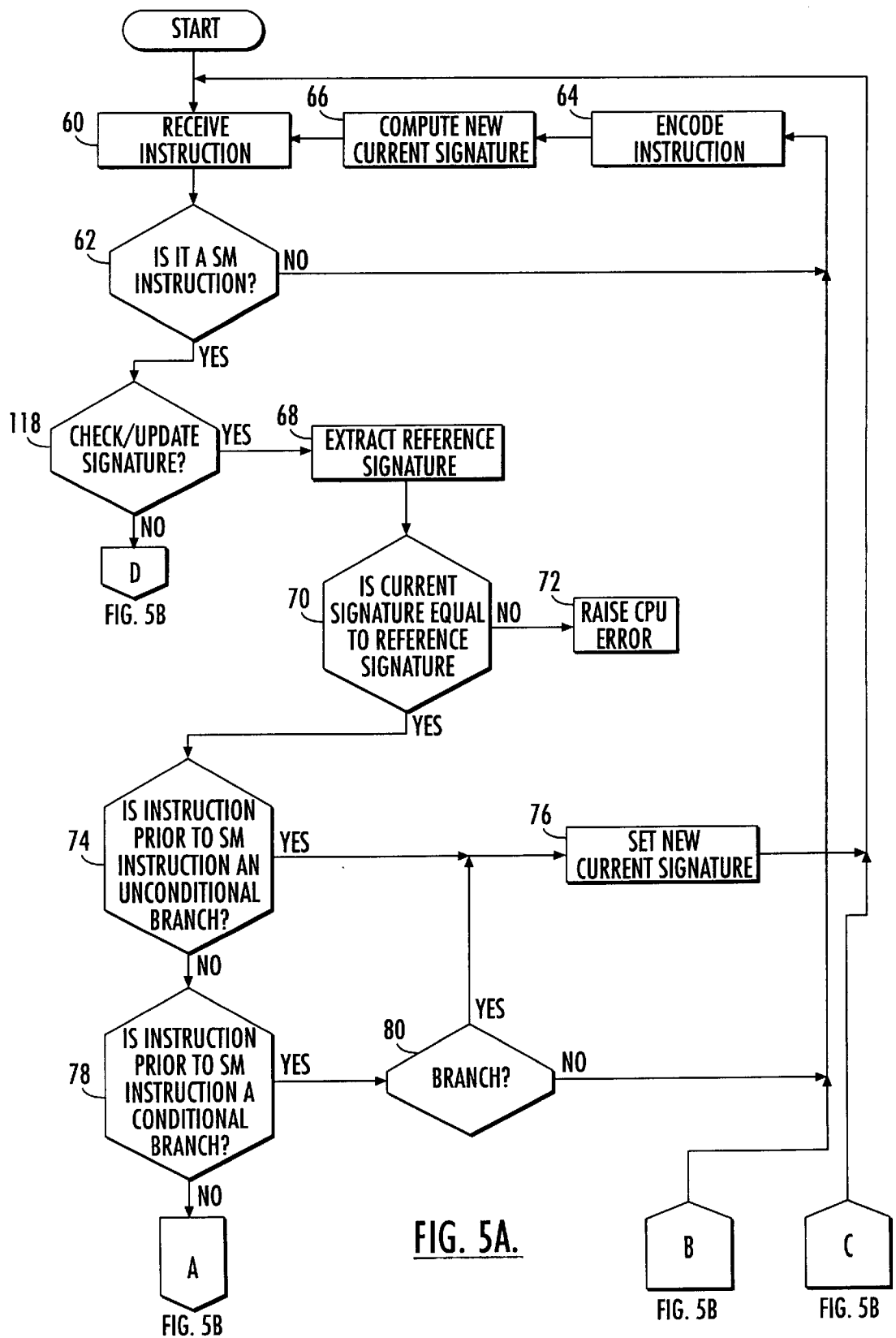
Figure 5C:
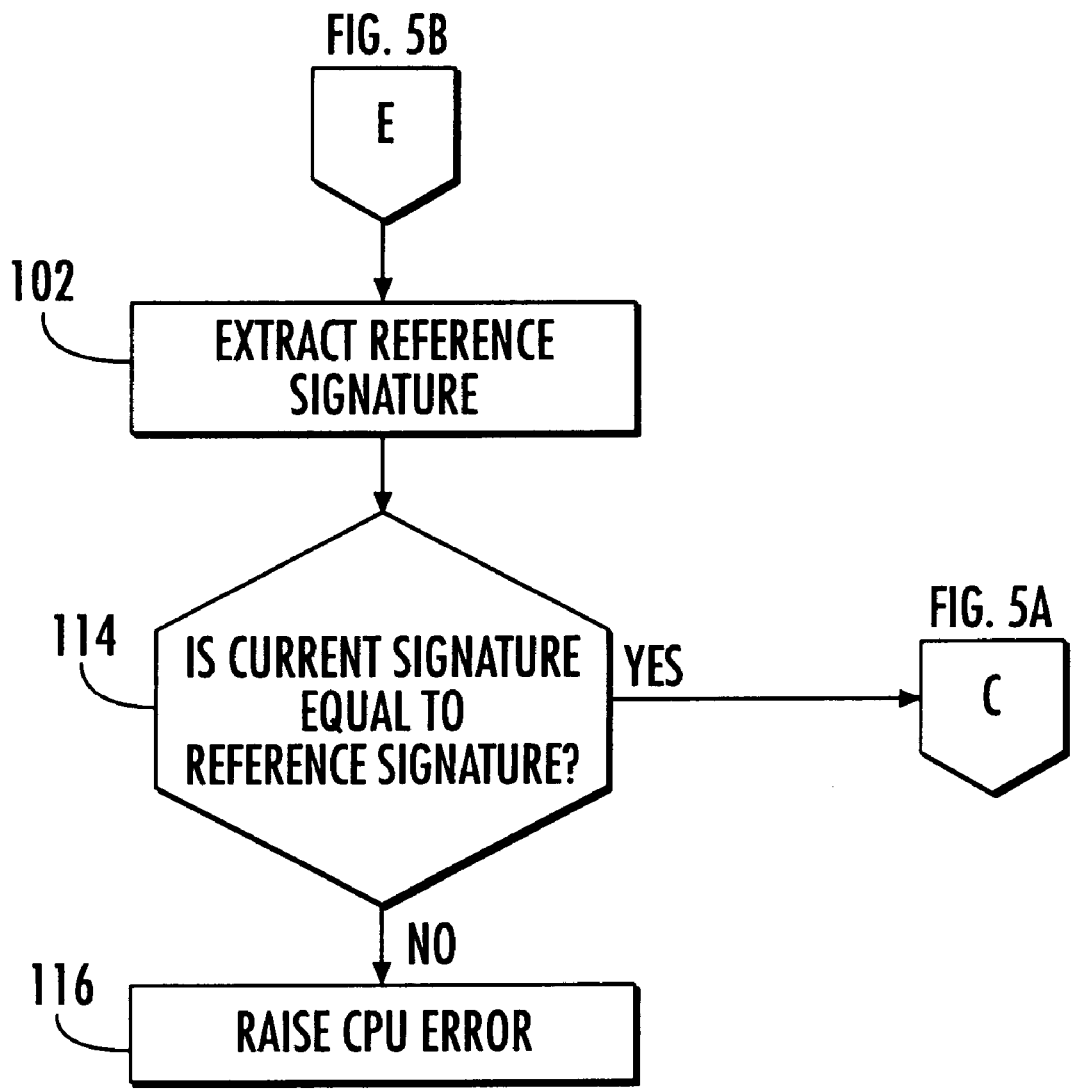

The preferred operation and sequence of events corresponding with an embodiment of the signature monitoring of a single instruction by the RISC processor 10 of the present invention and the associated methodology are described hereafter with reference to FIGS. 5A–5C.

In operation, an instruction is received and decoded by the register fetch mechanism 14 (FIG. 2), as indicated by block 60. At Block 62, it is determined if the instruction is an SM instruction. If the instruction is not a SM instruction, then the current signature is updated by encoding the instruction, and computing a new current instruction, as indicated by blocks 64 and 66, respectively. It is noted that the instruction encoding step 64 may be omitted, if desirable, such as may be the case if the instruction word is relatively small. A new current signature value is then generated based upon the current signature and the encoded instruction.

If it is determined at block 62 that the instruction is an SM instruction, then one of four potential operations is triggered: a signature check and initialization, a signature initialization only, a signature check only, or no operation. The control field of the SM instruction is decoded to determine if the instruction is a check/update, as indicated by block 118. If the control code in the control field of the SM instruction is a signature check/update, then a signature check is performed at blocks 68 and 70. Specifically, the reference signature is extracted from the SM instruction by the register fetch mechanism 14, as indicated by block 68. The reference signature is then compared with the current signature to determine if the current signature is equal to the reference signature, as indicated by block 70. If the two signatures are not equal, then a CPU error is raised, as indicated by block 72, to indicate an error in the control flow.

If it is determined at block 70 that the two signatures are equal, then further decoding is necessary to determine the approach to initialize the current signature. It is determined at block 74 whether the instruction immediately prior to the SM instruction is an unconditional branch. If the instruction is an unconditional branch, then a new current signature value is used, as indicated by block 76. The current signature value is then extracted by the register fetch mechanism 14 from the SM instruction and is loaded into the current signature register 36 via line 44. The next instruction is processed beginning at block 60. If, however, the instruction is a conditional branch, as determined by block 78, then a determination is made whether to execute the branch, as determined at block 80. If the branch is taken, then it is treated just like an unconditional branch, and a new current signature value is used, as indicated by block 76. If the branch is not taken, then the branch instruction is treated like any other instruction, and is processed by blocks 64 and 66, as described above.

If the instruction is neither an unconditional nor a conditional branch, then a check is made at block 82 (FIG. 5B) to determine if it is a subroutine. If it is a subroutine call, then the change in control flow will be temporary and control flow is expected to return to instructions in the calling routine. The current signature is therefore pushed onto the current register stack, as indicated by block 84. The new current register value is then extracted from the SM instruction by the register fetch mechanism 14 and deposited in the current signature register 36, as indicated by block 86.

The purpose of inserting a SM instruction that is not preceded by an instruction that changes control flow may be to perform a signature check on a code segment. Thus, if it is determined at block 82 that the instruction prior to the SM instruction is not a subroutine call, the reference and current signatures are compared, as indicated by block 88. If the signatures are not equal, then a processor error is raised, as indicated by block 100. If the signatures are equal, then the execution resumes with the generation of a new current signature value, as indicated by blocks 64 and 66.

By its nature, an interrupt is an asynchronous event that may occur at any time. It temporarily changes the control flow, during the handling of the interrupt, in a manner similar to the execution of a subroutine. Once an interrupt occurs, as in block 106, the current signature value is pushed onto the signature stack, as indicated by block 102. Since a new signature can only be set by a SM instruction, the first instruction to be executed by the interrupt handling routine is a SM instruction to set the current signature value. The execution resumes at block 60 where a new instruction is fetched.

In the case of an interrupt handler, the instruction is bound to be a SM instruction to initialize the current signature value, as determined in block 108 and executed in block 110. The SM instruction may also be to check the signature, as determined by block 112. In this case, the reference signature is extracted from the SM instruction, and is compared with the current signature as indicated by block 102 and 114, respectively. If the signatures are not equal, then a processor error is raised, as indicated by block 116. Otherwise, the execution resumes with the fetch of a new instruction, as indicated by block 60.

In the drawings specification, there had been disclosed typical preferred embodiments of the invention, and all of the specific terms are employed, they are used in a generic descriptive sense only and not for purposes of limitation, the scope of the invention being set forth in the following claims.

Wherefore, the following is claimed:

1. A method for control flow error detection in a reduced instruction set computer (RISC) processing system, comprising steps of:
   receiving a signature monitoring instruction;
   receiving an instruction;
   computing a current signature;
   computing a new current signature based on the current signature and the instruction, in response to the signature monitoring instruction;
   generating a reference signature based on the instruction;
   comparing the new current signature and the reference signature to detect if a control flow error has occurred;
   storing the current signature in a current signature memory device;
   encountering a branch; and
   if the branch is taken, then storing the current signature in a saved signature memory device, and resetting the stored current signature to a new current signature value associated with a target instruction occurring first in the branch.

2. The method of claim 1, further comprising a step of generating an error message based on said step of comparing the current signature and the reference signature.

3. The method of claim 1, wherein said step of generating the reference signature includes the step of processing the instruction utilizing a software tool to generate machine code.

4. The method of claim 3, wherein the software tool inserts the signature monitoring instruction at a location selected from a group consisting of a beginning of a program, a beginning of an interrupt handling routine, and a location immediately after a branch instruction in the program.

5. The method of claim 1, further comprising the steps of:
   storing the current signature in a current signature memory device;
   encountering a branch instruction; and
   if the branch is not taken, then utilizing the stored current signature to generate a new current signature.

6. The method of claim 1, wherein upon returning from the branch, resetting the signature value stored in the current signature memory device to the signature value stored in the saved signature memory device.

7. The method of claim 1, wherein said step of computing the current signature comprises a step of generating an encoding of the instruction using a cyclic redundancy code technique.

8. The method of claim 1, wherein said step of computing the current signature comprises a step of executing a checksum operation on the instruction.

9. The method of claim 1, further comprising a step of encoding the instruction prior to said step of computing the current signature.

10. The method of claim 1, further comprising a step of inserting the signature monitoring instruction into an instruction flow of the RISC processing system.

11. The method of claim 10, wherein said step of inserting the signature monitor instruction into an instruction flow comprises a step of inserting a signature monitoring instruction which compares the current signature and the reference signature.

12. The method of claim 10, wherein said step of inserting the signature monitor instruction into an instruction flow comprises a step of inserting a signature monitoring instruction which includes a new signature based on a branch instruction of a branch.

13. The method of claim 10, wherein said step of inserting the signature monitor instruction into an instruction flow comprises a step of inserting a signature monitoring instruction which includes a new signature.

14. The method of claim 10, wherein said step of inserting the signature monitor instruction into an instruction flow comprises a step of inserting a signature monitoring instruction which compares the current signature and the reference signature, and includes a new signature.

15. The method of claim 10, wherein said step of inserting the signature monitor instruction into an instruction flow comprises a step of inserting a signature monitoring instruction which performs no operation.

16. A system for control flow error detection in a reduced instruction set computer (RISC) processing system, wherein RISC processing system includes a memory device, comprising:
   means for receiving an instruction and a signature monitoring instruction;
   means for retrieving a new signature from said memory device;
   means for generating a current signature based on said new signature and said instruction wherein said means for generating a current signature is responsive to the signature monitor instruction;
   means for generating a reference signature based on said instruction;
   means for comparing said current signature and said reference signature; and
   means for resetting the current signature, upon entering a branch, to a new current signature value associated with a target instruction in the branch.

17. The system of claim 16, further comprising means for encoding said instruction.

18. The system of claim 16, wherein said means for generating a reference signature comprises a software tool for processing said instruction.

19. The system of claim 16, wherein said means for generating a new current signature includes means for generating a cyclical redundant code utilizing said instruction and said current signature.

20. The system of claim 16, wherein said means for generating a current signature includes means for executing a checksum operation utilizing said instruction and said new signature.

21. The system of claim 16, further comprising means for generating an error message based on an output of said means for comparing.

22. The system of claim 16, further comprising means for inserting said signature monitoring instruction into an instruction stream of said RISC processing system.

23. A system for control flow error detection in a reduced instruction set computer (RISC) processing system, wherein said RISC processing system receives an instruction flow including an instruction, comprising:

a reference signature generation mechanism that generates a signature monitoring instruction that is inserted into said instruction flow, and wherein said reference signature generation mechanism further generates a reference signature based on said instruction;

a current signature generation mechanism that generates a first current signature utilizing said instruction and a prior current signature previously generated by said current signature generation mechanism, wherein said current signature generation mechanism generates said first current signature in response to said signature monitoring instruction;

a current signature register for receiving said first current signature from said current signature generation mechanism and for receiving a second current signature associated with a target instruction in a branch; and a comparator that compares said first current signature from said current signature register and said reference signature from said reference signature generation mechanism if a branch is not taken in order to detect errors in said construction flow, and compare said second current signature from said current signature register and said reference signature from said reference signature generation mechanism if a branch is taken in order to detect errors in said instruction flow.

24. The system of claim 23, further including a saved signature register that saves said current signature for use in returning from a branch.

25. The system of claim 23, wherein said reference signature generation mechanism comprises a software tool for processing said instruction to generate said reference signature.

26. A method for control flow error detection in a reduced instruction set computer (RISC) processing system, comprising steps of:

receiving a signature monitoring instruction;

receiving an instruction;

computing a current signature;

computing a new current signature based on the current signature and the instruction, in response to the signature monitoring instruction;

generating a reference signature based on the instruction;

comparing the new current signature and the reference signature to detect if a control flow error has occurred;

storing the current signature in a current signature memory device;

encountering a branch instruction; and if the branch is not taken, then utilizing the stored current signature to generate a new current signature.

* * * * *

UNITED STATES PATENT AND TRADEMARK OFFICE
CERTIFICATE OF CORRECTION

PATENT NO. : 5,974,529

DATED : October 26, 1999

INVENTOR(S) : Zumkehr et al.

It is certified that error appears in the above-identified patent and that said Letters Patent is hereby corrected as shown below:

Title page, [56] References Cited, U.S. PATENT DOCUMENTS, insert the following:

--5,748,950   5/1998   White et al.--.

Title page, [56] References Cited, insert the following:

--OTHER PUBLICATIONS

Joakim Ohlsson et al., "A Study of the Effects of Transient Fault Injection Into A 32-Bit RISC With Built-In Watchdog," IEEE 1992, pp. 316-325.--.

Signed and Sealed this

Twenty-fifth Day of July, 2000

*Attest:*

Q. TODD DICKINSON

*Attesting Officer*   *Director of Patents and Trademarks*